United States Patent Office 2,969,392
Patented Jan. 24, 1961

2,969,392

AMIDOMETHYLATION OF AROMATIC HYDROCARBONS

William D. Schaeffer, Pomona, Calif., assignor to Union Oil Company of California, Los Angeles, Calif., a corporation of California No Drawing. Filed Dec. 30, 1957, Ser. No. 705,776

8 Claims. (Cl. 260—562)

This invention relates to the amidomethylation of aromatic hydrocarbons with N-methylolamides, to form mono- or poly-amidomethylated products. The process consists simply in contacting the desired aromatic hydrocarbon, which must contain at least one replaceable ring hydrogen atom, with the desired N-methylolamide in the presence of a catalyst composed essentially of sulfuric acid plus water.

The principal object of the invention is to provide amidomethylation catalysts which are selective in their action, and yet sufficiently active to complete the reaction at moderate temperatures and reaction times. A further object is to provide catalysts of the above character, which are in addition economical both in use and initial cost. Another object is to provide desirable solvent media for amidomethylation, such that the reaction mixture will be easily handleable. Other objects will be apparent from the more detailed description which follows:

The amidomethylation of aromatic compounds in the presence of acid condensation catalysts is in general well known. The following equation illustrates the general nature of the reaction where benzene is the raw material:

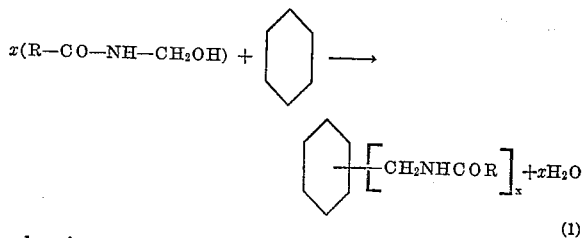

(1)

wherein R may be any compatible residue. The resulting amidomethylated compounds are useful intermediates for the production of a variety of valuable products. They may for example be oxidized to form aromatic acids, or hydrolyzed to form aromatic mono- or poly-amines. Previously known amidomethylation catalysts are either so expensive, or nonselective, or of such low activity, that the process has never been considered attractive for the manufacture of chemical intermediates. In general, previously known amidomethylation catalysts result in poor yields and low conversions, and excessively long contact times may be required. The sulfuric acid-containing catalysts of this invention have been found to be surprisingly active and selective.

It has long been known that aromatic compounds containing an electron-donating functional group on the ring are very easily amidomethylated. For example, aromatic compounds containing attached to the ring a hydroxyl group, an alkoxy group, or the like can be easily amidomethylated using substantially any acidic condensation catalyst. In the past, concentrated sulfuric acid, hydrochloric acid, zinc chloride, and the like have been employed to effect amidomethylation of e.g. phenols, anisoles and the like.

It has now been found that condensation catalysts which are well suited for the amidomethylation of aromatics containing an electron-donating polar functional group are often totally ineffective for the amidomethylation of aromatic hydrocarbons. For example, it has been found that concentrated sulfuric acid is ineffective for amidomethylating reactive aromatic hydrocarbons, the predominating reaction being in most cases sulfonation. Concentrated or dilute hydrochloric acid was found to be substantially wholly inactive at feasible temperatures and reaction times.

It was most unexpectedly discovered however that mixtures of sulfuric acid with water are both highly active and very selective for catalyzing the amidomethylation of aromatic hydrocarbons. Moreover, good control can be maintained; by varying the mole-ratio of N-methylolamide used, either mono-amidomethylated or poly-amidomethylated products can readily be obtained. These results are obtained moreover at ordinary room temperatures, and with short reaction periods of about one to two hours.

Other catalysts are known which are very active for the amidomethylation of both hydrocarbons and polar-substituted hydrocarbons. Such catalysts include for example trifluoroacetic acid, trichloroacetic acid, liquid HF and the like. These catalysts however are all subject to one or more of the disadvantages of being expensive, toxic, dangerous, corrosive, and difficult to recover from the reaction product. The catalysts of this invention are inexpensive, nonhazardous under ordinary conditions, and are easily recoverable from the reaction mixtures.

The N-methylolamides used herein are ordinarily prepared by reacting a carboxylic acid amide with formaldehyde or paraformaldehyde, as follows:

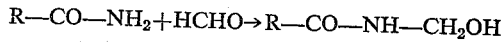

wherein R may be any compatible residue. This preparation is well known and hence need not be described in detail.

Suitable amidomethylating agents to be used herein include in general any N-methylolamide which is free of interfering functional groups. Such agents may be designated by the formula:

wherein R may be another —NR'—CH$_2$OH group, hydrogen, methyl, ethyl, propyl, isopropyl, butyl, isobutyl, hexyl, dodecyl, etc.; and R' may be hydrogen, methyl, ethyl, propyl, isopropyl, butyl, isobutyl, hexyl, dodecyl, formyl, acetyl, and the like. In any of the foregoing permutations, the terminal ends of the R and R' radicals may be joined together to form a cyclic amide or imide. Suitable examples include N-methylol formamide, N-methylol acetamide, N-methylol propionamide, N-methylol-N-methyl formamide, N-methylol-N-methyl acetamide, N-methylol diacetamide, N-methylol succinimide, bis methylol urea, 2,5-diketo-piperazine, and the like. The preferred class of N-methylolamides is represented by the formula:

wherein R is hydrogen or a lower alkyl radical having from 1 to about 6 carbon atoms.

Suitable aromatic hydrocarbons which may be amidomethylated herein include benzene, naphthalene, anthracene, phenanthrene, diphenyl, diphenylmethane, triphenylmethane, toluene, ethylbenzene, cymene, cumene, p-xylene, m-xylene, o-xylene, pseudocumene, p-ethyl toluene, m-ethyl toluene, o-ethyl toluene, mesitylene, hemimellitene, p-diethylbenzene, m-diethylbenzene, o-diethylbenzene, 2-ethyl-p-xylene, 5-ethyl-m-xylene, 4-ethyl-o-xylene, durene, isodurene, n-dodecyl benzene, α-methyl naphthalene, β-methyl naphthalene, 1,5-dimethyl naphthalene, 1,4,5,8-tetramethyl naphthalene, tetralin, and the like. Mixtures of such compounds may also be employed. In general, any monocyclic or polycyclic aromatic or alkyl-aromatic hydrocarbon containing at least one active ring hydrogen atom may be employed.

It is found that substantially any mixture of sulfuric acid with any proportion of water will provide a catalyst of improved activity as compared to sulfuric acid alone. However, the effect of the added water does not become highly significant until sufficient has been added to provide in the mixture about 0.25 mole thereof per mole of sulfuric acid. At the other end of the range it is found that the activity of the catalyst declines markedly when sufficient water is used to provide in excess of about 4 moles thereof per mole of sulfuric acid. Under normal conditions of amidomethylation, it is therefore contemplated to employ catalyst mixtures containing between about 0.25 and 10 moles of water per mole of sulfuric acid.

The precise optimum ratio of sulfuric acid to water varies somewhat with the reaction conditions, higher proportions of sulfuric acids being employed at lower temperatures and lower proportions at higher temperatures. Normally, when the reaction is conducted at between about 0° and 75° C. it is found that the optimum proportion lies in the neighborhood of 1–2 moles of water to one mole of sulfuric acid, or more generally within the range of about 0.75 to 5 moles of water per mole of sulfuric acid. These optimum proportions are intended to mean initial proportions of water to sulfuric acid, and take into account the effect of the water liberated during amidomethylation.

While any amount of the mixed catalyst is effective in some degree, it is preferred to employ sufficient thereof to provide a liquid reaction medium, and to overcome excessive dilution resulting from the liberated water of reaction. Normally about 0.5 to 5 moles of mixed catalyst per mole of total reactants will be employed.

The amidomethylation is normally conducted in the liquid phase at moderate temperatures of e.g. 0°–150° C., and preferably between about 10° and 100° C. Where mono-amidomethylation is desired it is preferred to use a slight mole excess of aromatic hydrocarbon, as the excess hydrocarbon is normally easier to recover than excess N-methylolamide. Where diamidomethylation is desired it is preferred to use substantially two moles of N-methylolamide per mole of hydrocarbon. To effect the reaction, the desired reactants plus the catalyst are simply agitated together for the required length of time until the reaction is complete. In a preferred modification, the N-methylolamide is added gradually to the hydrocarbon-catalyst mixture, in order to avoid side reactions as far as possible. This modification is particularly desirable when higher temperatures are employed, which sometimes tend to cause two molecules of the N-methylolamide to react with each other, with elimination of water and the formation of a diamido ether or a methylene bis-amide. The products of reaction are insoluble in water, and may hence be recovered by simply quenching the reaction mixture in an excess of water. The solid amidomethylated product is then recovered as by filtration, and the catalyst components and any excess hydrocarbon may be recovered in any desired manner, as by distillation.

Certain of the aromatic hydrocarbons disclosed above are more susceptible to amidomethylation than others. For example the fused-ring aromatics, especially when substituted by an alkyl group, are much more reactive than the alkyl benzene hydrocarbons. Benzene itself is the most difficult member to amidomethylate. Hence, the reaction conditions, i.e. temperature and/or sulfuric acid concentration in the catalyst should be highest in the case of benzene, intermediate in the case of alkyl benzenes, and lowest in the case of fused-ring aromatic hydrocarbons.

The following examples are cited to illustrate certain modifications of the invention, but are not intended to be limiting in scope:

EXAMPLE I

A series of experiments was carried out to determine the optimum sulfuric acid/water ratio for the diamidomethylation of p-xylene. In each case, 80 ml. of the acid catalyst mixture, 10.6 gms. (0.1 mole) of p-xylene, and 17.8 gms. (0.2 mole) of N-methylolacetamide were placed in a 250 ml. flask, and stirred at 30° C. for one hour. The reaction mixture was then poured slowly into an excess of water and crushed ice, and the solid phase which separated was filtered off, washed and dried. The product in all cases was 2,5-diacetamidomethyl-p-xylene. The yields were as follows:

Table

| Run No. | Vol. Percent $H_2SO_4$ | Percent Yield [1] |
|---|---|---|
| 1 | 100 | 0 |
| 2 | 90 | 44 |
| 3 | 80 | 51 |
| 4 | 70 | [2] 85 |
| 5 | 60 | 36 |

[1] Based on N-methylolacetamide.
[2] Upon repeating this run, a 90.5% yield was obtained.

This example demonstrates that substantially equimolar mixtures (run No. 4) of water and sulfuric acid are much superior to other ratios.

EXAMPLE II

Another experiment was carried out under the conditions of Example I, using equi-molar quantities of toluene and N-methylolacetamide, and 80 ml. of concentrated sulfuric acid. Aliquots of the reaction mixture were quenched in water after 15 minutes, 45 minutes, 1.5 hours and 3.0 hours contact time. In no case was any solid precipitate obtained, showing that 100% sulfuric acid is ineffective at shorter or longer contact times.

EXAMPLE III

An equi-molar mixture of toluene (35 ml.) and N-methylolacetamide (17.8 gms.) was again reacted at 30° C. for 1 hour, but using 80 ml. of

70% $H_2SO_4$–30% $H_2O$ as catalyst. In this case a 54% yield of mono (acetamido methyl) toluene was obtained, again showing the definite superiority of the dilute sulfuric acid over the concentrated acid. Using 80% $H_2SO_4$–20% $H_2O$, the yield was 58%.

EXAMPLE IV

The procedure of Example III was repeated using 80 ml. of concentrated (30%) hydrochloric acid as catalyst, while continuously passing dry HCl through the mixture. The yield of acetamidomethyl toluene was substantially zero. Upon repeating the experiment at 55° C. using water-HCl, and at 90° C. using saturated HCl-acetic acid, the yield was still zero, showing that HCl mixtures are not equivalent to water-$H_2SO_4$ mixtures, and are of no practical use.

EXAMPLE V

Amidomethylation of naphthalene: To a 250 ml. flask was added 40 ml. of $H_2SO_4$, 40 ml. of $H_2O$, 1 gm. of sodium dodecylbenzene sulfonate (dispersant), and 12.8 gms. (0.1 mole) of naphthalene. A total of 17.8 gms. (0.2 mole) of N-methylolacetamide was added slowly at 80–85° C., and the mixture was stirred at that temperature for 1 hour, then quenched in an excess of ice water. The solid was filtered off, washed and dried. The yield of di(acetamidomethyl) naphthalene was 93%.

EXAMPLE VI

A 0.1 mole portion of p-xylene was subjected to amidomethylation with 0.2 mole of N-methylolformamide, using 70% $H_2SO_4$–30% $H_2O$ and a reaction time of 0.5 hour, the conditions being otherwise the same as in Example I. A 62.5% yield of 2,5-di(formamidomethyl)-p-xylene was obtained. An equivalent yield of 2,5-di(N-methylformamido-methyl)-p-xylene is obtained when 0.1 mole of N-methyl-N-methylolformamide is used in place of the N-methylolformamide.

From the foregoing it will be apparent that the process of this invention provides a novel, economical and convenient method for effecting the amidomethylation of aromatic hydrocarbons. It is not intended that the foregoing description should be limiting in scope except where indicated. The true scope of the invention is intended to be embraced by the following claims.

I claim:

1. A method for effecting amidomethylation of an aromatic hydrocarbon selected from the class consisting of unsubstituted aromatic hydrocarbons and alkyl substituted aromatic hydrocarbons containing at least one active ring hydrogen atom, which comprises contacting said hydrocarbon with an N-methylolamide at a temperature between about 0° and 150° C. in the presence of sufficient of a liquid catalyst to provide a fluid reaction medium, said catalyst consisting essentially of a mixture of sulfuric acid and between about 0.75 and 10 moles of water per mole of sulfuric acid, said N-methylolamide having the formula:

$$R-CO-NR'-CH_2OH$$

wherein R is selected from the class consisting of hydrogen, lower alkyl and $-NR'-CH_2OH$, and R' is selected from the class consisting of hydrogen and lower alkyl, and recovering an amidomethylated aromatic hydrocarbon from the reaction mixture.

2. A method as defined in claim 1 wherein said catalyst consists of about equimolar proportions of sulfuric acid and water.

3. A method as defined in claim 1 wherein said N-methylolamide is an N-methylolamide of a lower alkanoic acid containing from 1 to 6 alkyl carbon atoms.

4. A method for effecting amidomethylation of p-xylene which comprises intimately contacting p-xylene with an N-methylolamide at a temperature between about 10° and 100° C. in the presence of sufficient of a liquid catalyst to provide a fluid reaction medium, said catalyst consisting essentially of a mixture of sulfuric acid and between about 0.75 and 10 moles of water per mole of sulfuric acid, said N-methylolamide having the formula:

$$R-CO-NR'-CH_2OH$$

wherein R is selected from the class consisting of hydrogen, lower alkyl and $-NR-CH_2OH$, and R' is selected from the class consisting of hydrogen and lower alkyl, and recovering amidomethylated p-xylene from the reaction mixture.

5. A method as defined in claim 4 wherein said N-methylolamide is N-methylolacetamide.

6. A method as defined in claim 4 wherein said N-methylolamide is N-methylolformamide.

7. A method for effecting amidomethylation of naphthalene which comprises intimately contacting naphthalene with an N-methylolamide at a temperature between about 10° and 100° C. in the presence of sufficient of a liquid catalyst to provide a fluid reaction medium, said catalyst consisting essentially of a mixture of sulfuric acid and between about 0.75 and 10 moles of water per mole of sulfuric acid, said N-methylolamide having the formula:

$$R-CO-NR'-CH_2OH$$

wherein R is selected from the class consisting of hydrogen, lower alkyl and $-NR'-CH_2OH$, and R' is selected from the class consisting of hydrogen and lower alkyl, and recovering amidomethylated naphthalene from the reaction mixture.

8. A method as defined in claim 7 wherein said N-methylolamide is N-methylolacetamide.

References Cited in the file of this patent

UNITED STATES PATENTS

| | | |
|---|---|---|
| 1,699,245 | Luther | Jan. 15, 1929 |
| 2,312,896 | Graenacher et al. | Mar. 2, 1943 |
| 2,340,528 | Haack | Feb. 1, 1944 |
| 2,586,168 | Kaszuba | Feb. 19, 1952 |
| 2,761,868 | Lacey | Sept. 4, 1956 |

FOREIGN PATENTS

| | | |
|---|---|---|
| 156,398 | Germany | Nov. 28, 1904 |